United States Patent
Baxter

(12) United States Patent    (10) Patent No.: US 7,129,714 B2
Baxter    (45) Date of Patent: Oct. 31, 2006

(54) CAPACITIVE MEASUREMENT SYSTEM

(76) Inventor: Larry K. Baxter, 63 Norwood Heights, Gloucester, MA (US) 01930

( * ) Notice: Subject to any disclaimer, the term of this patent is extended or adjusted under 35 U.S.C. 154(b) by 34 days.

(21) Appl. No.: 10/994,536

(22) Filed: Nov. 22, 2004

(65) Prior Publication Data

US 2005/0099188 A1    May 12, 2005

Related U.S. Application Data

(63) Continuation-in-part of application No. 10/188,598, filed on Jul. 2, 2002, now abandoned.

(51) Int. Cl.
*G01R 27/26* (2006.01)

(52) U.S. Cl. ............ 324/678; 324/658; 324/686; 324/679

(58) Field of Classification Search ......... 324/678, 324/679, 658, 686
See application file for complete search history.

(56) References Cited

U.S. PATENT DOCUMENTS

| | | | |
|---|---|---|---|
| 5,194,819 A * | 3/1993 | Briefer | ............ 324/684 |
| 5,629,629 A | 5/1997 | Tielert et al. | |
| 5,659,254 A | 8/1997 | Matsumoto et al. | |
| 6,362,627 B1 * | 3/2002 | Shimamoto et al. | ........ 324/434 |
| 6,377,056 B1 * | 4/2002 | Hanzawa et al. | ........... 324/678 |
| 6,639,414 B1 * | 10/2003 | Lien | ........................... 324/658 |

OTHER PUBLICATIONS

Jones, R.V. and Richards,J.C.S. "The Design and Some Applications of Sensitive Capacitance Micrometers" Journal of Physics E: Scientific Instruments 1973, vol. 6, pp. 589-600, Great Britain.

Baxter, Larry K., "Capacitive Sensors Design and Applications", 1997, pp. v-xi and Chapter IV pp. 48-60, IEEE Press, Piscataway, NJ.

* cited by examiner

*Primary Examiner*—Diane Lee
*Assistant Examiner*—Marina Kramskaya
(74) *Attorney, Agent, or Firm*—George A. Herbster

(57) ABSTRACT

Sensor circuits for the measurement of small variations in the value of a sensing capacitor. An alternating voltage excites the sensing capacitor a predetermined frequency whereby the voltage on the sensing capacitor reverses polarity. This voltage on the sensing capacitor is sampled each time the voltage reverses polarity. An accumulator accumulates the sampled charges from the sensing capacitor. An output signal that represents the charge in the charge accumulating means indicates the measured capacitance.

29 Claims, 8 Drawing Sheets

Fig. 1   RC OSCILLATOR - PRIOR ART
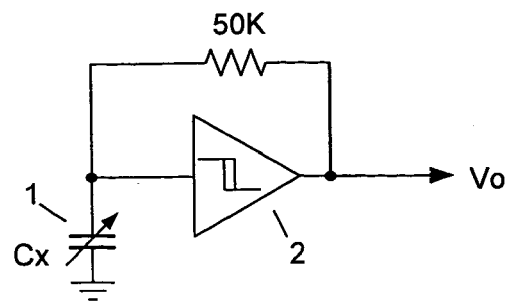
Fig. 2   CHARGE TRANSFER DEMODULATOR - PRIOR ART
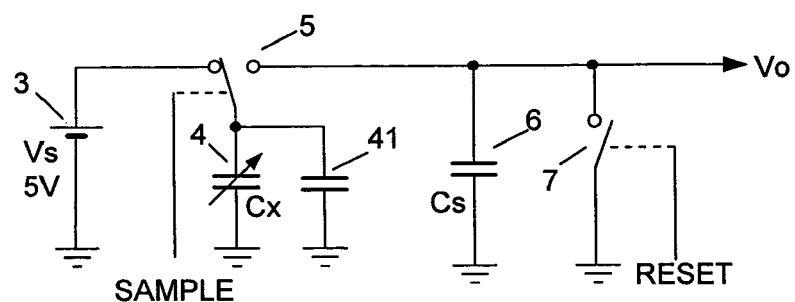
Fig. 3
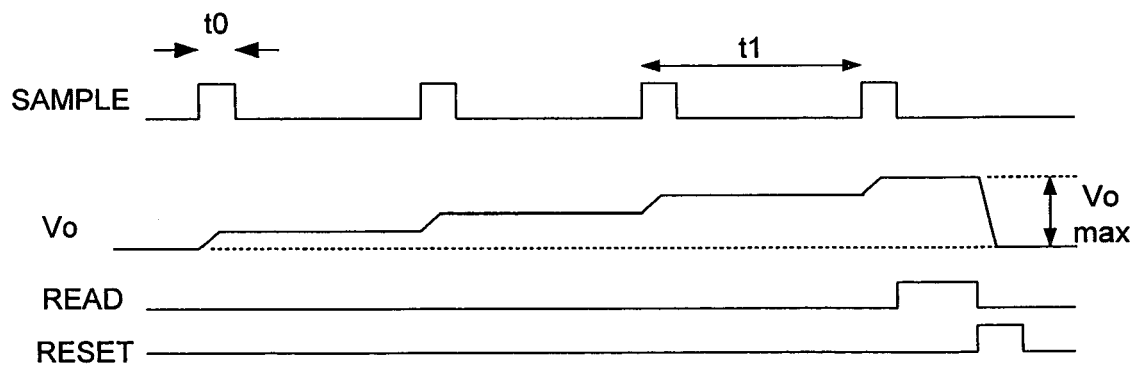

Fig. 4   SYNCHRONOUS DEMODULATOR - PRIOR ART
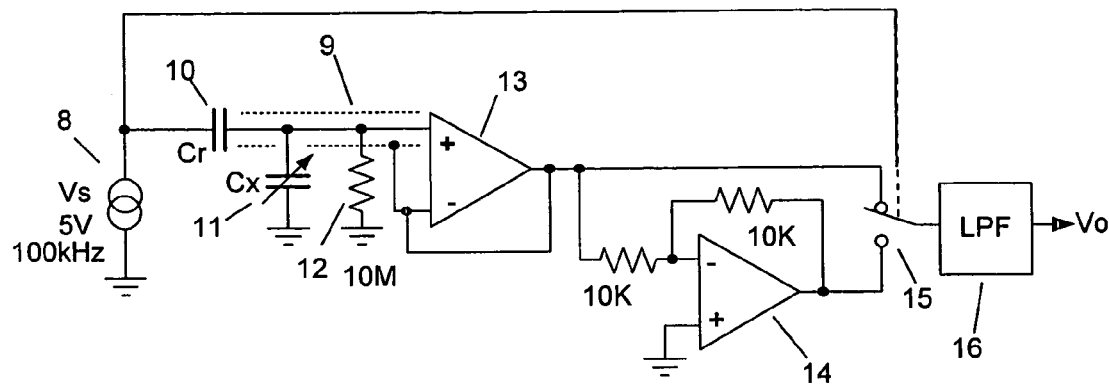
Fig. 5
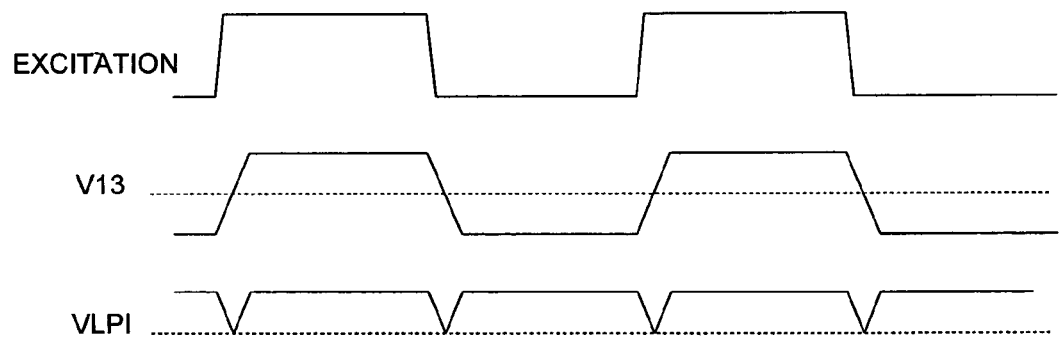

CAPACITIVE MEASUREMENT SYSTEM

CROSS REFERENCE TO RELATED APPLICATION

This application is a continuation-in-part application of my application Ser. No. 10/188,598 filed Jul. 2, 2002 for Capacitive Measurement with Good Noise Rejection (now abandoned).

BACKGROUND OF THE INVENTION

1. Field of the Invention

This invention generally relates to capacitive measurement circuits and methods and particularly to circuits and methods for measuring small values of capacitance with good rejection of circuit and ambient noise.

2. Description of Related Art

Capacitive sensors have many uses. These include measurements of pressure, humidity, motion, rotation, material composition, and proximity variables. In practice, a variable to be sensed is converted to a variable capacitance, this variable capacitance is measured, and its value is observed directly or processed by computer. The capacitance levels may range from a small fraction of a picofarad to many picofarads.

A typical problem requiring measurement of small capacitance in the presence of noise is to detect the proximity of human hand, for example a hand about to be trapped in a closing automobile window or caught in a machine. Systems are available for this purpose that excite a metal plate, perhaps 1"×10", with an AC voltage of several volts and 1 kHz–1 MHz frequency, and measure the plate's capacitance to ground. As a hand nears, this capacitance increases by a very small value, typically less than one pF. As the environment is often electrically noisy, with nearby fluorescent lamps or radio transmitters, a critical specification is the circuit's noise rejection.

The extraordinary sensitivity of the technology is explored by Jones and Richard's seminal paper [Jones, R. V. and J. C. S. Richards, 1973, *The Design and Some Applications of Capacitive Micrometers*, Journal of Physics E: Scientific Instruments 6: 589–600]; this paper demonstrates a signal to noise ratio (SNR) of well over a million to one. Yet many capacitive sensor tasks are at the limit established by amplifier noise and would benefit by lower noise. Normal capacitive motion sensors have a resolution about the same as laser interferometers, considered the state of the precision motion measurement art; an order of magnitude improvement would allow even more precise metrology.

Two different circuits are commonly used to demodulate capacitive sensors for lowest noise:

1. Classic designs [Jones and Richards; Baxter, L. K., 1997, Capacitive Sensors. N.J.: IEEE Press, p.54] drive the capacitor to be measured with, say, a 5V square wave at 100 kHz, and measure the resulting current with a linear amplifier followed by a synchronous demodulator.

2. Improved charge-balance designs [Baxter, p. 55] drive the measured capacitor and a reference capacitor with opposite phases, with the drive voltage adjusted so that the resulting current is zero. A linear amplifier and synchronous demodulator are used here also.

Capacitive sensors that operate in a noisy environment are described in the following references:

U.S. Pat. No. 5,436,613 (1995) Ghosh et al.
U.S. Pat. No. 5,525,843 (1996) Howing
U.S. Pat. No. 5,722,686 (1998) Blackburn et al.
U.S. Pat. No. 5,744,968 (1998) Czarnocki et al.
U.S. Pat. No. 5,802,479 (1998) Kithil et al.
U.S. Pat. No. 6,158,768 (2000) Steffen, Jr. et al.

Two-dimensional finger position sensors or touch panels for computer input often use capacitive sensing. U.S. Pat. No. 4,698,461 (1987) to Meadows et al. shows a capacitively-sensed touch panel that changes the circuit's operation frequency to avoid interfering noise sources; this added circuit complexity would not be needed if the circuit was intrinsically less susceptible to noise.

As described in Baxter, Larry K., *Capacitive Sensors*, supra, three well-known circuits for detecting a small capacitance are (1) the RC oscillator circuit, (2) the synchronous demodulator circuit, and (3) the charge transfer circuit. These circuits have different strengths and weaknesses, and an understanding of their operation is important for the understanding of the present invention.

FIG. 1 depicts a prior-art RC oscillator, such as shown in U.S. Pat. No. 6,307,385 (2001) to Tardif et al. This is a simple circuit in which frequency is proportional to the reciprocal of capacitance, as given by:

$$f = K/RCx \qquad (1)$$

where K is a constant determined by the threshold voltage of a Schmitt trigger 2, f is output frequency R is resistance, here 50K ohms, and Cx is the measured capacitance of variable capacitor 1.

The RC oscillator detects capacitance as a frequency variation. But it is very susceptible to noise. Interfering noise can be considered as either AC noise or impulse noise. AC noise typically is confined to a narrow frequency band, illustrated by AM radio transmitters or power line radiation. Impulse noise typically is confined to a narrow time slice, like switch noise, motor brush noise, or semiconductor lamp dimmer transients.

The RC oscillator of FIG. 1 is susceptible to both noise sources. First, AC noise coupling to the variable capacitance is directly added to the measurement output. This is a serious drawback, as most industrial sites have considerable noise at power frequencies and their harmonics, peaking at 50 or 60 Hz and decreasing towards 100 kHz. Also, impulse noise acts to increase the frequency by triggering the oscillator prematurely. This behavior is typical of any sense circuit that includes a comparator: an impulse just before the RC voltage reaches the comparator threshold triggers the cycle early, but an impulse just after the threshold is ignored. This imparts a DC offset that is not removed by a following low pass filter. Other circuits, like those depicted in FIGS. 2 and 4, do not have this behavior.

FIG. 2 discloses a charge transfer circuit of the type described in U.S. Pat. No. 4,345,167 (1982) to Calvin. It has low power dissipation and better noise rejection than the RC oscillator circuit in FIG. 1. In operation, semiconductor switch 5 normally connects capacitor 4, Cx, in parallel with a small stray capacitance 41, to the DC supply voltage 3, say 5V. Cx, charged to 5V, holds a charge Q=CV or 5 pC for a 1 pF Cx. The switch 5 is then momentarily connected to capacitor 6, Cs, for a uS or less, as shown in the timing diagram of FIG. 3. This transfers most of Cx's charge to Cs when SAMPLE is high. SAMPLE is advantageously set to the minimum time t0 that will allow full charge transfer.

As Cs is usually many times larger than Cx, say 100 times larger, the voltage on Cs increases by about 50 mV with each SAMPLE pulse. After switch 5 is cycled perhaps 20 times, the voltage on capacitor 6 is nearly 1V, and this voltage can be easily measured.

The output voltage Vomax is then read externally, coincident with the READ pulse of FIG. 3, then the reset switch 7 is momentarily connected to discharge Cs and the measurement cycle is repeated.

The timing diagram of FIG. 3 shows operation with just four charge transfer pulses. As the number of charge transfer pulses per read-reset operation increases, the noise rejection increases but the response time decreases.

This circuit has an important advantage of sampling speed. It is sensitive to noise only during the very short time interval when switch 5 is connected to capacitor 6, perhaps 20 nS for a fast switch. If t1 is chosen as 10 uS so the excitation frequency is 100 kHz, the circuit is open to noise only 0.2% of the time, and the noise rejection is 500×.

The short sample time possible with a low-cost CMOS switch contributes the noise rejection of a very fast excitation frequency without power-hungry amplifiers, and while using a low excitation frequency with its advantages in power and electromagnetic interference. This fast sample rate at low power, the inherent noise-reducing averaging across many samples, and the voltage gain without amplifiers make this an attractive circuit.

However, the charge transfer circuit does not reject AC noise very well. The narrow sampling window improves impulse noise performance considerably compared to the RC oscillator of FIG. 1, but the circuit is influenced by AC noise over a wide bandwidth. Noise frequencies of 60 Hz, for example, couple to Cx and appear directly in the output.

Another drawback of the simple circuit of FIG. 2 is that it is nonlinear, with an exponential transfer function $$Vo_i = Vs(1 - e^{-\frac{Cx}{Cs}i}) \qquad (2)$$

where i is the number of sample pulses.

Also in this circuit stray capacitance 41 from the sensed node of Cx to ground adds to the measured capacitance and hurts accuracy.

Many other charge transfer circuits are described in the literature, such as:

U.S. Pat. No. 5,451,940 (1995) Schneider et al.
U.S. Pat. No. 5,751,154 (1998) Tsugai
U.S. Pat. No 6,377,056 (2002) Hanzawa et al.

However, none of these references uses AC excitation so each is susceptible to errors due to noise.

The prior art synchronous demodulator circuit of FIG. 4 shows considerable improvement over the circuit of FIG. 1. The sensed capacitor 11 is excited with, for example, a square wave generator 8 at 100 kHz. This excitation signal can be produced by a logic gate. This 100 kHz signal also controls switch 15.

A reference capacitor 10 works with measured capacitance 11 as a voltage divider. A unity-gain, low-bias-current operational amplifier 13 buffers the very high capacitive impedance. This amplifier is preferably a FET-input type with a frequency response greater than 10 MHz, such as Analog Device's AD823. Some method of setting the DC level at the amplifier input is needed, such as the high-value resistor 12 or a momentary switch to ground (not shown).

Stray capacitance to ground, as with capacitor 41 of FIG. 2, can add to capacitor 11 and hurt the measurement accuracy. A prior-art solution is shown, where the sense node is shielded and the shield 9 is connected to the output of the unity gain amplifier. The stray node capacitance is converted from capacitance to ground to capacitance to the shield. Stray capacitance is then driven on both sides by the same voltage, no current can flow in it and it disappears from the circuit equation, except by adding to noise. This guard technique can be applied to any of the circuits of this patent.

The variable amplitude square wave at the output of amplifier 13 feeds the synchronous demodulator 14–15, where SPDT switch 15 is a high-speed CMOS switch available from many semiconductor manufacturers, such as the Maxim MAX4053 CMOS switch available from Maxim Integrated Products, Inc. of Sunnyvale, Calif. If the circuit and the switch are integrated on silicon, the switch can have improved performance and lower capacitance. The synchronous demodulator inverts alternate half cycles of the 100 kHz square wave, and the 100 kHz component of the resulting rectified signal is removed by low pass filter 16. FIG. 5 shows the excitation waveform and the variable-amplitude signal at the output of V13, and the input of the low pass filter 16, VLPI.

The filtered output measures the capacitance with the nonlinear equation:

$$Vo = VsCx/(Cx+Cr) \qquad (3)$$

This circuit rejects impulse noise better than the RC oscillator but not as well as the charge transfer circuit of FIG. 2. It rejects AC noise better than either; it is sensitive to AC noise only if its frequency is near the 100 kHz carrier, specifically within a frequency band equal to twice the low pass filter's cutoff frequency. centered on 100 kHz. As the LPF bandwidth can be much smaller than 100 kHz, say 1 Hz, the synchronous demodulator can have a very narrow-band response that rejects AC noise. To see how this works, imagine a 60 Hz signal coupled to Cx. It appears at the input of the low pass filter 16 as a alternate-cycle modulation at a 100 kHz frequency, but the low pass filter will almost completely remove this high-frequency modulation and hence the 60 Hz component.

The low pass filter type can be selected to optimize noise rejection, with a simple RC low pass for AC noise or a median filter for impulse noise. For best noise rejection the excitation frequency should be very high, say 10 MHz, and the operational amplifier should have ten times this bandwidth for good stability. As the sample time is reduced and the number of sample pulses increases, noise rejection improves directly. A limitation of the synchronous demodulator circuit for low-noise applications is that this high frequency operation requires expensive, power-hungry components and may cause excessive electromagnetic radiation.

SUMMARY

An object of this invention is to improve on the noise rejection of prior art circuits thereby assuring a noise performance many times the best now available.

A second object is to apply this improvement to another common capacitive sense application, that of detecting the mutual capacitance of two sense plates.

A third object is to linearize capacitive sense circuits.

A fourth object is to add a guard electrode to the charge transfer circuit that eliminates or reduces the effect of stray capacitance to ground.

A fifth object is to apply this invention to a number of divers applications including an array of sensors on the skin of a robot to sense proximity, automobile seat sensors to detect the position and size of passengers for airbag deployment, computer-input touch panels, or production line sensors to detect the proximity of metallic objects.

In accordance with one aspect of this invention a sensor for the measurement of small variations in the value of a sensing capacitor excites the sensing capacitor with an alternating voltage at a predetermined frequency whereby the voltage on the sensing capacitor reverses polarity. This voltage on the sensing capacitor is sampled each time the voltage reverses polarity. An accumulator accumulates the sampled charges from the sensing capacitor. An output signal that represents the charge in the charge accumulating means indicates the measured capacitance.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 1 shows prior art, a simple RC oscillator.

FIG. 2 shows prior art, a charge transfer circuit.

FIG. 3 is a timing diagram for FIG. 2.

FIG. 4 shows prior art, a synchronous demodulator.

FIG. 5 is a timing diagram for FIG. 4.

DESCRIPTION OF ILLUSTRATIVE EMBODIMENTS

Figure 6:
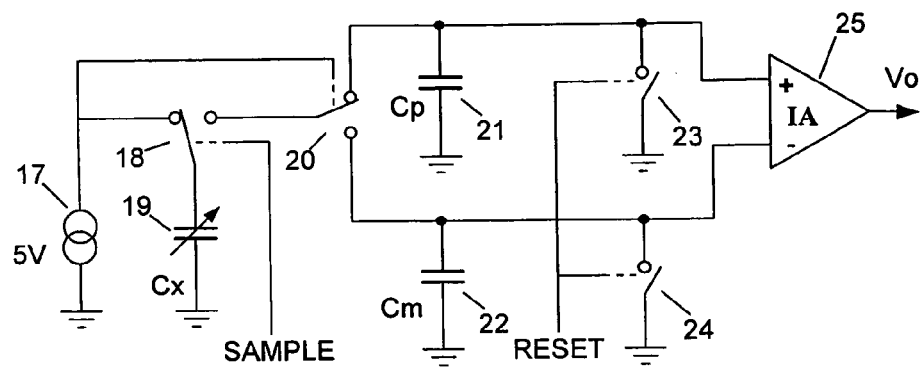
FIG. 6 shows a charge transfer circuit with improved noise performance in accordance with the present invention.
Figure 7:
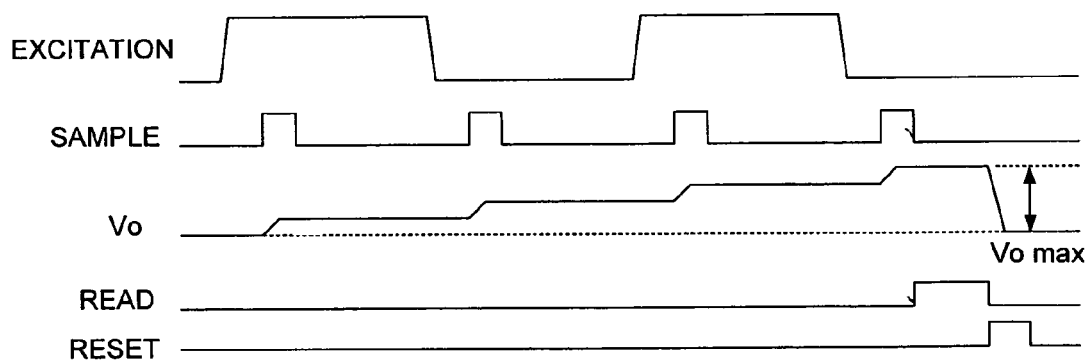
FIG. 7 is a timing diagram for FIG. 6

FIG. 6 and the timing diagram of FIG. 7 show a circuit with improved noise rejection, an embodiment of the current invention. First, a bipolar ±/−5V square wave 17 is connected through switch 18 to charge measured capacitor 19, Cx, to +5V. Switch 18 then is momentarily connected to switch 20 and capacitor 21 for about 20 nS during SAMPLE time to dump Cx' charge into capacitor 21. The cycle repeats for each reversal of the excitation square wave; on negative excursions of square wave 17 switch 18 charges capacitor 19 to −5V and dumps this charge into capacitor 22.

The sample time, as shown in FIG. 7, should be delayed from the excitation so that Cx is fully charged before sampling.

Although only four cycles are shown, generally this sequence repeats at about 100 Hz for a large number of cycles, say 200, until Cp is charged to about +1V and Cm is charged to −1V. Instrumentation amplifier 25, similar to Texas Instruments' INA311, outputs VCp-VCm and the capacitors 23, 24 are discharged by the RESET pulse, ready to begin a new measurement cycle. Cp and Cm should be equal value for best noise rejection. If Cp=Cm=Cs, the output Vo is given by equation (1).

This circuit improves on the charge transfer circuit because it responds to noise as does the synchronous demodulator. That is, it responds only to noise very close to the 100 kHz excitation frequency. It retains the noise rejection of the simple charge transfer circuit, as its sample switch is only open to noise for 20 nS every 10 uS. So its noise rejection can be a factor of 250 better than the synchronous demodulator providing a large factor improvement on the simple charge transfer circuit. Both circuit noise and ambient noise are rejected.

As the circuit in FIG. 6 has two channels, VCp and VCm, they must be balanced for good performance. If the capacitors Cp and Cm are not identical, noise rejection suffers. When this is an issue, the circuit of FIG. 8, with its timing diagram FIG. 9, can be substituted. This circuit of FIG. 8 uses only one storage sensing capacitor Cs. Storage capacitor 31 (Cs) is connected through sample switch 28 and reversing switch 29–30 to capacitor 27 (Cx). The sensing capacitor 27 (Cx) is charged to alternately positive and negative voltage by 100 kHz excitation power source 26, but the capacitor 31 is charged just positively.

Capacitor 31 is buffered with a high impedance amplifier 34 from which an output Vo is a measurement of Cx at READ time; it can feed a sample-and-hold circuit or a sampling analog-to-digital converter responsive to the READ pulse. After Vo is read, storage capacitor 31 is reset by switch 32 to initialize the circuit for the next measurement. The output equation of FIG. 8 is the same as the output equation of FIG. 6.

Alternate schemes are possible to handle sampling and demodulation, the reversing switch is not needed. Any switching scheme needs to sample the charge of Cx with a short time window and also needs to provide a method to collect the alternating charge packets and sum them to a DC level. For instance, another possible implementation is, with appropriate logic changes, to combine the functions of switches 28, 29, 30 into two switches. Or the synchronous demodulator of FIG. 4 may be used, with a short-time-window sample and hold following the input amplifier, timed to sample soon after the excitation transition.

Figure 8:
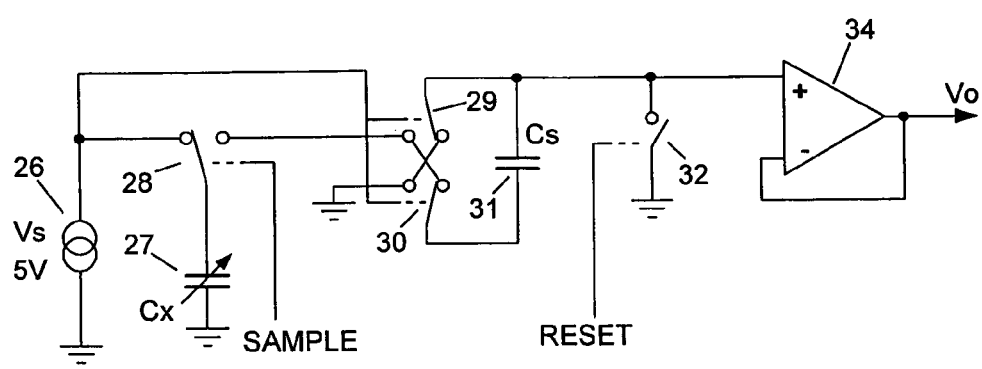
FIG. 8 shows an improvement over FIG. 6 to measure a ground-referenced capacitor with improved stability and noise.
Figure 9:
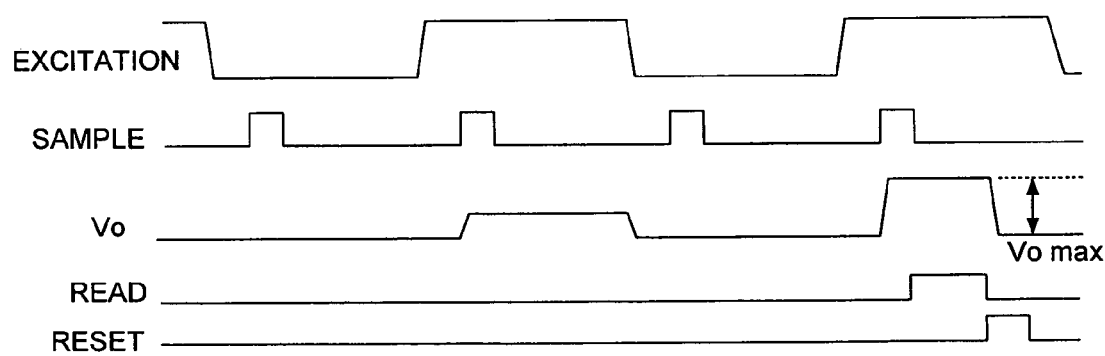
FIG. 9 is a timing diagram for FIG. 8.

The circuit of FIG. 8 has further advantages over the simple charge transfer circuit of FIG. 2 and also over FIG. 6. Semiconductor switches inject a small charge at their terminals with every transition, on the order of a few pC. This injected charge may be more than the measured charge and may not be stable, changing with temperature and DC voltage level. This problem is handled by FIG. 8, however, as the injected charge alternates for each pulse, and an output low pass filter averages the variations to zero.

FIG. 8 is a preferred embodiment for low noise capacitive sensors if linearity and stray capacitance rejection are not needed.

In summary, the simple charge transfer circuit of FIG. 2 improves upon the synchronous demodulator circuit of FIG. 3 by use of a very narrow sample window that rejects noise; and the current invention as shown in FIG. 6 and FIG. 8 improves on the simple charge transfer circuit of FIG. 2 by reversing the excitation for alternating samples. This AC excitation blocks low-frequency noise, has a narrow band pass response that further rejects noise, and rejects several circuit contributions to noise and instability such as charge injection and amplifier offset voltage.

The foregoing circuits have a measured capacitor Cx with one plate connected to ground. Some improvement in performance is possible if neither plate of the capacitor is grounded; one benefit is that stray capacitance to ground does not affect the measurement. Simple circuit modifications handle this case.

Figure 10:
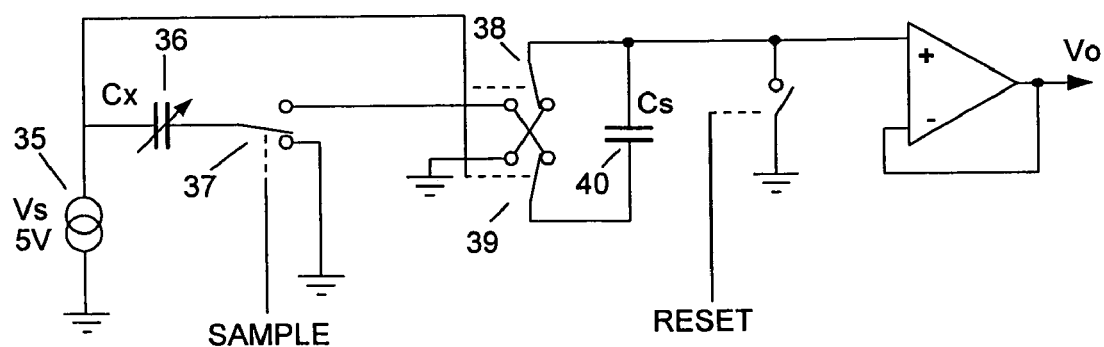
FIG. 10 shows a circuit as in FIG. 8 except configured to measure a capacitor with both terminals available

In FIG. 10, the right side of floating capacitor 36 (Cx) is normally connected to ground through switch 37, which should be a break-before-make type. The SAMPLE pulse briefly energizes switch 37 and connects capacitor 36 through switches 37, 38 and 39 to storage capacitor 40 (Cs) as shown in the timing diagram of FIG. 11. To capture all of the charge on capacitor 36, switch 37 should be disconnected from ground just before the transition of the excitation voltage 35 and connected to the reversing switches 38 and 39 just after the transition. Capacitor 40 (Cs) then captures the charge packet at the rise time.

The break-before-make switch can, of course, be replaced by a switch with an inhibit input to guarantee a long make-before-break interval for more reliable timing, or two switches with correctly phased controls.

The excitation frequency, shown as 100 kHz, can be almost any convenient value from 1 kHz to several MHz. The waveform can be square, rectangular, or narrow pulses of alternating polarity. Its DC level is unimportant. For one-plate-grounded capacitors, sine wave excitation with sampling at the peaks works well. Floating capacitors need a fast-rise-time excitation waveform like a square wave, sampled at the transitions.

Linearity is a common problem for all the charge transfer circuits. The output voltage is fairly linear with capacitance for low voltage levels, but as the output approaches the excitation voltage, the slope of the response trails off in classic exponential fashion. This can be handled by replacing the storage capacitor Cs with an operational amplifier, but the main advantage of the charge transfer circuit is lost, as this amplifier would need to have a very high frequency response for good charge transfer efficiency. If the amplifier frequency response is not at least 10 times higher than the excitation frequency the output will be low and unstable.

Figure 12:
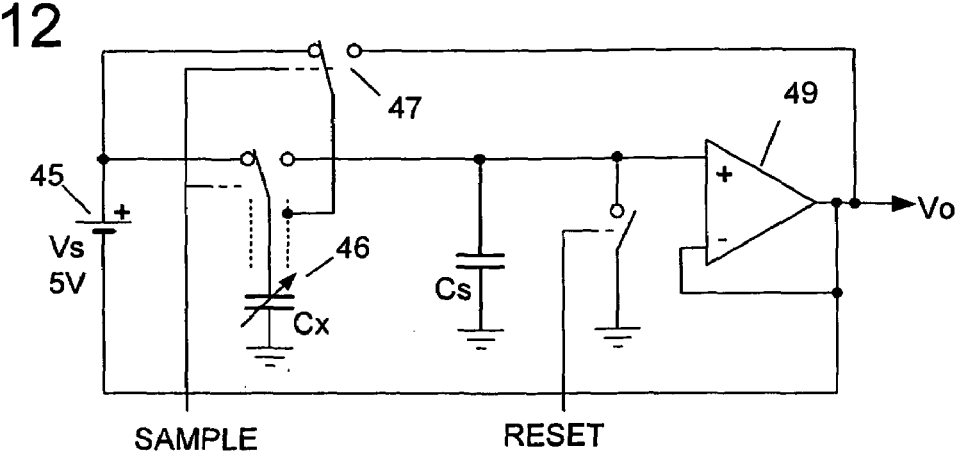
FIG. 12 shows a method of correcting the linearity of FIGS. 2, 4, 6, 8, and 10.

FIG. 12 depicts a circuit for applications where linearity is desired. This circuit is identical to FIG. 2, except the output voltage from output amplifier 49 feeds back to the negative terminal of excitation source in the form of a floating battery 45, so as the output increases the excitation voltage also increases. Alternately and preferably the battery could be replaced by a capacitor with a value high enough to store charge with low droop, with its voltage set to Vs during the reset cycle. The circuit of FIG. 12 operates according to:

$$Vo_i = i\left(\frac{Cx}{Cr} * Vs\right) \tag{4}$$

with i the number of sampling pulses in the measurement interval. The output voltage increases linearly with sampling, saturating at 2*Vs.

The linearizing technique shown in FIG. 12, feeding the output voltage back to the excitation voltage, can be applied to any of the charge transfer circuits, that is, FIGS. 2, 6, 8, and 10. For FIGS. 6, 8, and 10, the voltage on the capacitor Cs must be buffered and fed back to control the amplitude of the AC excitation as will be shown in the discussion of FIG. 14.

Stray capacitance to ground in any of the charge transfer circuits, shown as capacitor 41 in FIG. 2, can be guarded with a shield connected as shown in FIG. 12. A conducting shield shown as a dotted line surrounds the sense node of capacitor 46, Cx. The capacitance to ground is then replaced by capacitance to the shield. Then the shield is connected with break-before-make SPDT CMOS switch 47 alternately to the drive voltage and to the output buffer. As Cx is discharged by the sample pulse from Vs to Vo (the voltage on the storage capacitor Cs), the guard shield is driven to follow this voltage. With an identical voltage transient on both of its terminals, no current flows in the stray capacitance. This guarding technique is a preferred embodiment of the current invention in applications where stray capacitance is a problem.

Figure 13:
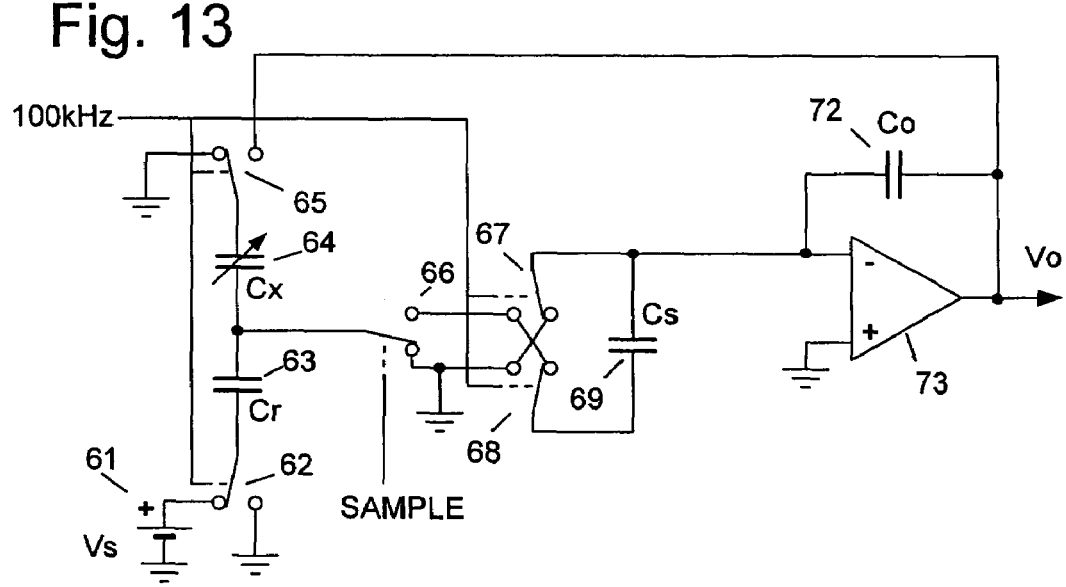
FIG. 13 shows an alternate circuit for a charge transfer demodulator with the noise advantages of FIG. 6 and a linear curve of output voltage vs. capacitance or a linear curve of output voltage vs. the reciprocal of capacitance.

FIG. 13 depicts another charge transfer circuit that retains the advantages of a short sampling window and AC excitation while providing a linear transfer function. In this circuit the capacitor to be measured has both plates floating and where a reference capacitor is available, preferably with characteristics that closely track the measured capacitor. FIG. 13 also provides an output signal that is linear with the reciprocal of Cx, rather than linear with Cx as in FIG. 12. In addition, a reference capacitor 63 is connected in a bridge circuit with the measured capacitor 64, Cx, with opposite excitation polarity.

The amplifier gain is very high for this circuit, say 100,000, not the 1× gain of previous circuits. Its steady-state equation, assuming high amplifier gain, is:

$$Vo = Vs * \frac{Cr}{Cx} \tag{5}$$

The output of the circuit as shown is linear with the reciprocal of Cx, useful for measuring changes of capacitor plate spacing. The position of the variable capacitor can be reversed with Cr if a linear-with-Cx output is needed.

With each cycle, the sampling switch 66 dumps the combined charge of capacitor 63 and 64 through reversing switch 67, 68 into storage capacitor 69. As the excitation driving capacitor 63 and capacitor 64 is opposite in phase, this charge will be nulled if the output voltage is equal to Vs and if capacitors 63 and 64 are equal.

Figure 11:
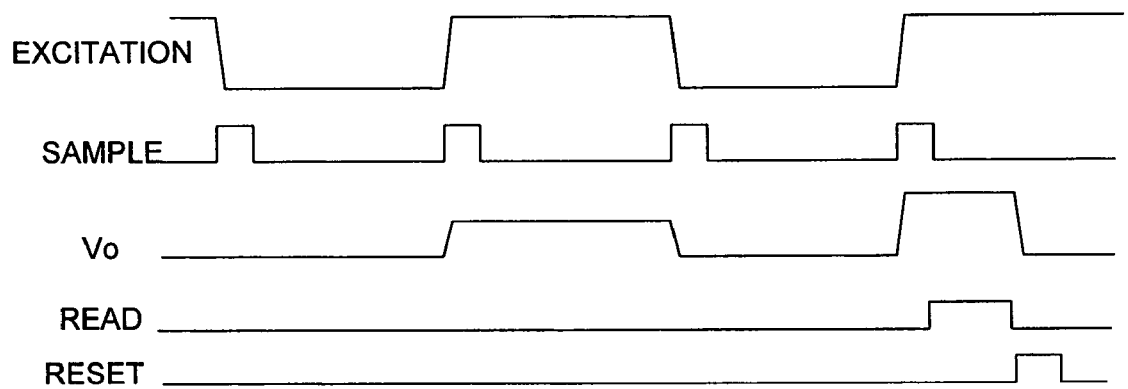
FIG. 11 is a timing diagram for FIG. 10

The timing diagram is similar to FIG. 11, with break-before-make switch 66 overlapping the excitation transient.

Each cycle the charge collected by capacitor 69 is dumped into capacitor 72, so if the bridge is out of balance Vo slews to rebalance it. Operational amplifier 73 should have a frequency response several times higher than the excitation frequency so that capacitor 72 can collect most of capacitor 69's charge. After startup, in a few tens or hundreds of cycles, the negative feedback drives the output voltage to a value that nulls the charge dumped into capacitor 69 and the circuit's equation (above) is satisfied.

This feedback circuit has a response time determined by capacitors 69 and 72, so these values should be low for fast response or high to filter noise. Of course, correct negative feedback polarity is needed.

The features of FIG. 13 can also be altered to suit the application. The 5V excitation of FIG. 8 is here replaced with a voltage supply 61 and a switch 62 to better track the characteristics of switch 65, but logic gate excitation is also an option. The reversing switch 67, 68 is a convenient way to demodulate the alternating charge packets, but other methods such as the synchronous demodulator of FIG. 3 are possible.

Figure 14:
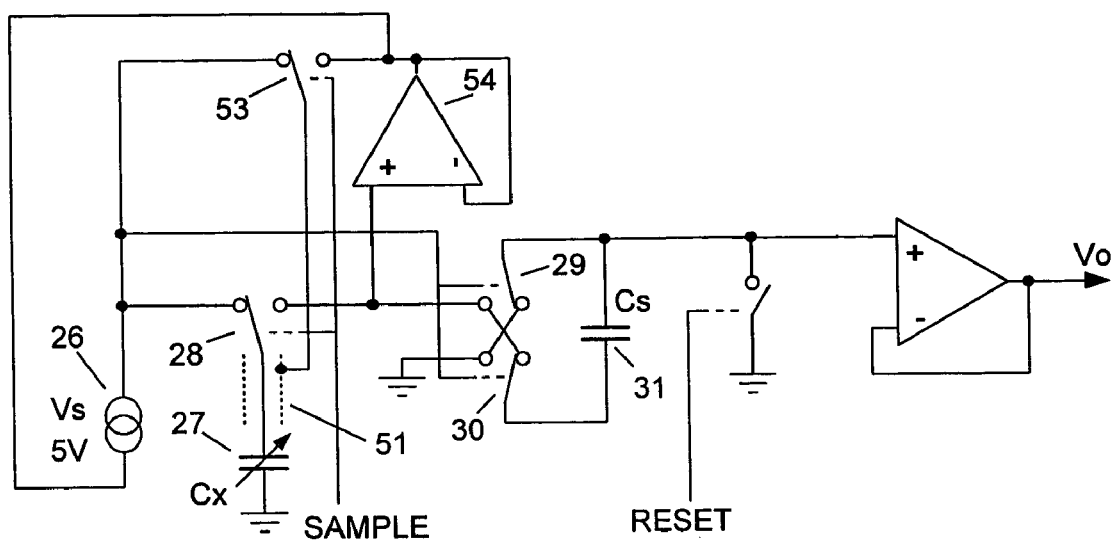
FIG. 14 shows the circuit of FIG. 8 with improved linearity and a way to guard stray capacitance.

FIG. 14 adds two parts to FIG. 8 to improve its linearity and to guard stray capacitance to ground. Its timing diagram is identical to FIG. 9.

Linearity is improved by buffering the high-impedance measured capacitor 27 with operational amplifier 54 and feeding this voltage back to the excitation 26. As storage capacitor 31 receives charge pulses and assumes an increasing positive voltage, the reversing switch 29, 30 presents amplifier 54 with an alternating voltage of increasing amplitude. The output from amplifier 54 adds to the excitation voltage so that each charge pulse is the same value, instead of exponentially decaying as capacitor 31 charges.

The amplifier should be fast enough to respond in a fraction of a cycle of the excitation voltage and have high input impedance. One such amplifier is an AD823 amplifier from Analog Devices, Inc. of Norwood, Mass.

Guarding is handled by adding switch 53. This switch operates in parallel with the normal sampling switch 28, injecting an equal and opposite charge into any parasitic capacitance between the sensed node and the guard shield 51. The sample pulse simultaneously drives the shield surrounding the sensitive node of Cx to a voltage that matches storage capacitor 27's voltage.

For certain applications the performance of these foregoing designs is limited by the circuit that amplifies the low-level current, often a charge amplifier in which the input stage is optimally a junction field effect (JFET) transistor with an input capacitance numerically equal to the measured capacitor, often 1–100 pF. The best JFET with this magnitude of capacitance has a voltage noise density of 2 nV, with an insignificant current noise (although for low excitation frequency and small sense capacitance, current noise may be a factor). The voltage noise will increase as about 1/f at low frequencies, so a carrier or chopping frequency above about 50 kHz is recommended.

This 1/f noise, as well as low-frequency energy inadvertently coupled from external circuits, is handled with pending application Ser. No. 10/188,598, but the voltage noise is generally considered a hard limit. An amplifier with optimum voltage noise and low current noise is best implemented with a JFET, as is well known to analog design practitioners. It is also well known that lowest noise is achieved when the JFET input capacitance matches the sensor capacitance, attenuating the signal by a factor of two. As JFET noise decreases as the square root of input capacitance, this is the optimum operating point, balancing FET noise with signal attenuation.

Imagine a step of voltage from 0 volts to a noisy V volts at t=0. If the noise is white Gaussian, the optimum detector for V observes the voltage for as wide as possible a window. The estimation of V improves as $\sqrt{observationtime}$, a long window works best.

A capacitive sensor design with an output bandwidth of 1 sample per second could use a 1 Hz square wave, continuously observed, or a 1 kHz square wave, sampled once per cycle with the samples averaged for 1 sec. The observation window of the 1 kHz waveform is 1000 times smaller, so its noise is $\sqrt{1000}$ times worse, but averaging 1000 samples gives a $\sqrt{1000}$ improvement.

This shows the well-known but counterintuitive result that conventional capacitive sensor noise, with square wave excitation, is independent of excitation frequency (provided that current noise is insignificant, as with JFETs, and provided sensor impedance is reasonably low).

For non-Gaussian noise, this is not true. Signals with added noise that is Gaussian with 1/f frequency weighting are optimally demodulated with a narrow but finite window. Signals contaminated with impulse noise are optimally demodulated with an infinitely small window, a strategy made approachable as the arrival time of each edge is known. Impulse noise is also optimally rejected with a median filter replacing the more typical averaging low pass filter.

But generally, correctly designed, well-shielded capacitive sensors need to combat only Gaussian noise.

It is possible to improve signal-to-noise ratios by increasing excitation voltage. However, this approach is limited by voltage breakdown and requires awkward components. Lower-noise semiconductors are not available. Parametric amplifiers have high input capacitance.

Figure 15:
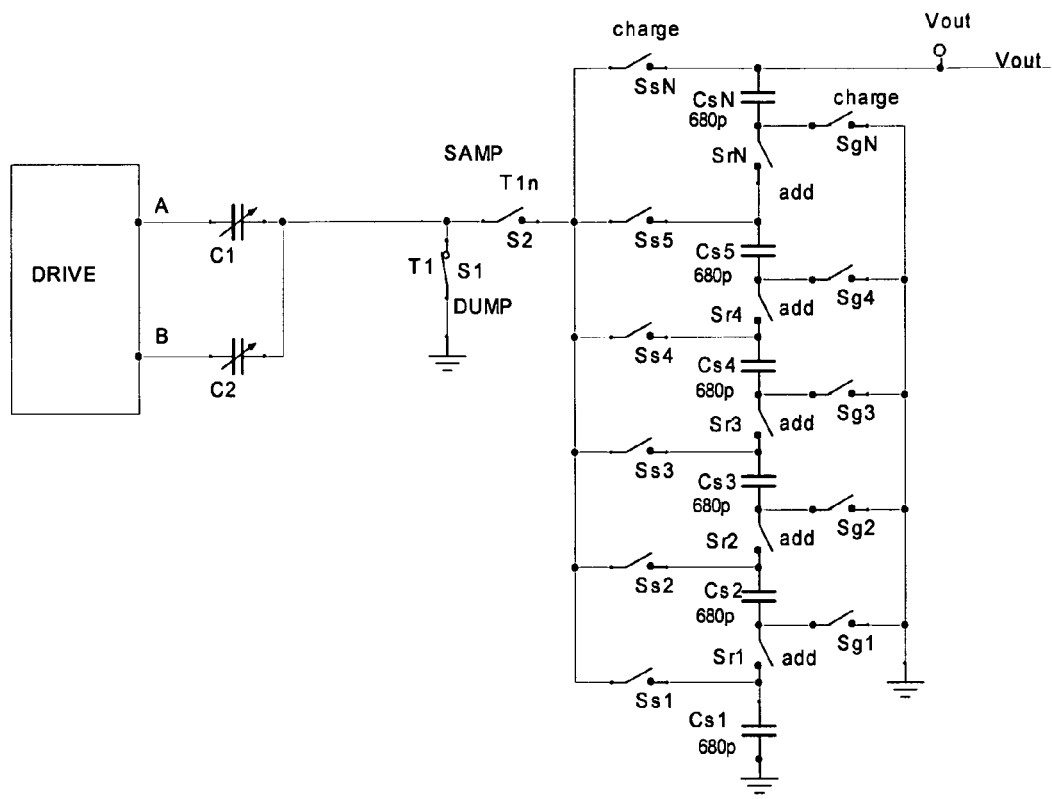
FIG. 15 shows a circuit that improves resolution by minimizing noise.
Figure 16:
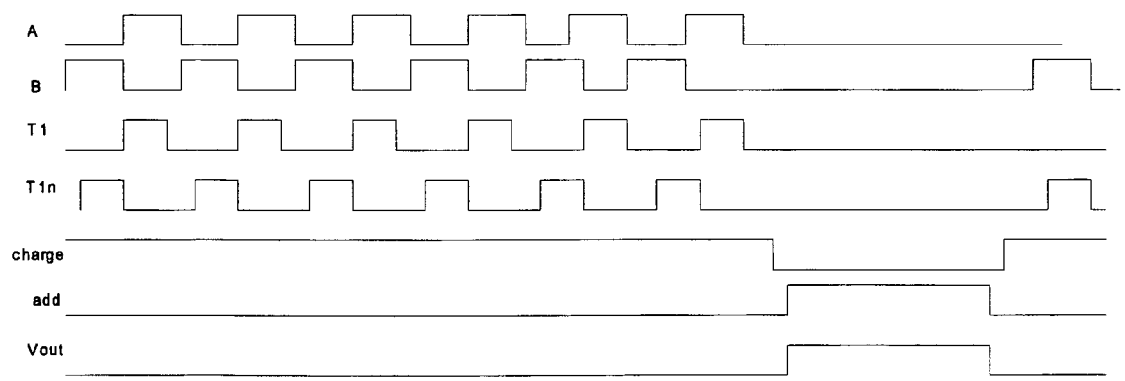
FIG. 16 is a timing diagram for FIG. 15.

FIG. 15 discloses another embodiment of the present invention that uses CMOS semiconductor switches to amplify voltage, with the benefits of lower noise and the use of low-power JFETs. More specifically, FIG. 15 shows a charge balance circuit measuring C1 and C2, but it can be used with single capacitors and grounded as well as floating capacitors. As shown in FIG. 16, when a "charge" control signal is asserted, switches Ss and Sg close and switches Sr open. Consequently each leading edge of 5V drive signals A and B pushes charge through a closed S2 into Cs1 through CsN capacitors in parallel. Then switch S1 dumps the charge of C1–C2 to zero and the cycle repeats. After N cycles, capacitors Cs are charged to:

$$Cn = 5v \frac{(C1 - C2)}{\left[ CsN \left( 1 - \frac{1}{e} \right) \right]} \qquad (6)$$

Then the "charge" control signal drops, and an "add" control signal is asserted. This causes the storage capacitors Cs1–CsN to connect in series through switches Sr1–SrN. This multiplies the voltage Cn by N. A low noise JFET amplifier, optimally with an input capacitance equal to Cs/N, reads out Vout.

Signal-to-noise ratio (SNR) improves by N with the N times voltage multiplication but is $\sqrt{N}$ lower due to the lower FET capacitance for an advantage of $\sqrt{N}$ over the standard circuit. A typical low noise JFET is an IF9030 JFET available from InterFET Corporation of Richardson, Tex. InterFET also provides JFET switches with a range of input capacitances, as needed to optimize individual sensors.

Low capacitance switches are important for this use. Discrete CMOS switches with a few pF are available, but integrated switches with fractional pF are preferred. A Maxim MAX4521 discrete CMOS switch is one example.

The switches will add some thermal noise; 1k ohm generates about 4 nV per root Hz. To keep the switch thermal noise of FIG. 15 well below the LNA noise, switches with a few hundred ohm ON resistance may be included.

The relationship between N and Csum can be chosen to charge Csum to about 50% of maximum value. If Csum is charged much higher than this, exponential response will hurt gain and noise.

Optimally, the well-known charge balance circuit as described in FIG. 13 of the pending application keeps Csum's voltage much less than 50%. For FIG. 15, the amplitude of drive signals A and B can be adjusted so that the average charge is nulled. This circuit improvement can advantageously apply to any of the charge transfer circuits discussed.

FIG. 15 shows unipolar operation, with the capacitors charging only positive. This configuration will admit low frequency noise, because it admits a large charge transfer pulse (1–5 pF) of the switch, as well as 1/f noise and power frequencies. However, this issue can be overcome by reversing drive signals A and B each charge cycle and similarly reversing the sign of Vout, with, for example, a synchronous demodulator. Practitioners ordinarily skilled in the state of the art will identify other equivalent methods to add the benefit of chopping.

Alternate sense capacitor configurations can include one or two grounded capacitors or one or two floating capacitors.

FIG. 8 is an application particularly adapted for low-noise applications with a measured capacitor having one terminal grounded. If good linearity is needed, feedback to the excitation voltage as taught in FIG. 14 is added. If guarding of stray capacitance to ground is needed, the guard circuit of FIG. 14 is added.

FIG. 10 is particularly adapted when both terminals of a measured capacitor are available. Its linearity can optionally be improved with the feedback to the excitation voltage as taught in FIG. 12.

FIG. 13 discloses a circuit for use when both terminals of the measured capacitor are available. This circuit produces an output that is linear with capacitance or linear with the reciprocal of capacitance.

Charge transfer demodulation for capacitive sensors offers the possibility of arbitrarily increased signal to noise ratio (SNR). While conventional demodulation has a SNR that is independent of frequency, the charge transfer model, with optimum sampling and a fixed output bandwidth, has a SNR that improves with the square root of excitation frequency. Many other low-noise measurement applications will be obvious, such as high-precision impedance measurement.

Various embodiments of this invention are disclosed. In some, small charge packets from the sensed capacitances are summed in a larger capacitor (or in the equivalent input capacitance of a low noise junction field effect transistor) and read out by a low noise JFET with input capacitance many times the sense capacitance. In another embodiment, small charge packets from the sensed capacitance are summed in N larger capacitors in parallel. Later, these N capacitors are reconnected in series and their voltage read out with a low noise JFET.

Several important advances for capacitive sensing circuits can be seen in this invention. The characteristics of synchronous demodulators and charge transfer circuits have been advantageously combined in a way to greatly increase the noise resistance, and added circuits show how to improve linearity and reject stray capacitance.

The descriptions show several circuits, but the scope of the invention is not limited to these particular implementations. For example, the linearity improvement illustrated in FIG. 14 could be applied to FIG. 6, or the synchronous demodulator of FIG. 4 could replace the reversing switch of FIG. 8.

This invention has been disclosed in terms of certain embodiments. It will be apparent that many modifications can be made to the disclosed apparatus without departing from the invention. For example, the charge transfer circuits of FIGS. 2, 6, 8, 10, and 12, the reset switch may be replaced with a high-value resistor Rr chosen so that the time constant Cs·Rr is larger than the excitation period. FIG. 14 illustrates a novel extension of this type of guard to a charge transfer circuit with AC excitation. Many other circuits can be imagined to accomplish this result. Therefore, it is the intent of the appended claims to cover all such variations and modifications as come within the true spirit and scope of this invention.

What is claimed as new and desired to be secured by Letters Patent of the United States is:

1. A sensor for the measurement of small variations in a value of a sensing capacitor comprising:
   A) means for exciting said sensing capacitor with an alternating voltage at a predetermined frequency whereby the voltage on the sensing capacitor reverses polarity,
   B) means for sampling the voltage on the sensing capacitor each time the voltage reverses polarity,
   C) means for accumulating the charge on the sensing capacitor from the sampling means during each sampling,
   D) means for generating an output signal that represents the charge in the charge accumulating means.

2. A sensor as recited in claim 1 wherein said accumulating means includes first and second capacitors, said first capacitor charges during a first polarity and said second capacitor accumulating charges during a second polarity during the operation of said sampling means.

3. A sensor as recited in claim 1 including a high impedance buffer means at an input to said sampling means for providing a linear relationship between changes in the output signal and in the value of the sensing capacitor.

4. A sensor as recited in claim 1 wherein said sampling means includes reversing switch means connected to said sampling capacitor for enabling the transfer of charge from said sensing capacitor to said charge accumulating means.

5. A sensor as recited in claim 1 wherein said sampling means includes single-pole double-throw switch means for alternately charging said sensing capacitor to an excitation voltage and discharging said sensing capacitor to said accumulating means and said output signal generator means includes high-input-impedance unity-gain buffer amplifier means for conveying the signal representing the accumulated voltage to an output port.

6. A sensor as recited in claim 5 including feedback means for feeding back the voltage at the output port to said excitation voltage whereby the output voltage has a linear relationship to the measured capacitance.

7. A sensor as recited in 1 for making linear measurements of small values of capacitive impedance including a reference capacitor in series connection with sensing capacitor and connected to said exciting means wherein said exciting means includes:
   i) a variable-amplitude alternating-current excitation voltage source connected to said sensing capacitor with its waveform in phase opposition to said fixed alternating-current excitation voltage, and
   ii) amplification-demodulation means with a gain substantially greater than one having an input connected to the junction of said reference and sensing capacitors, and an output with a direct-current level responsive to the difference of said reference capacitor's charge and said sensing capacitor's charge, whereby the output of said amplification-demodulation means assumes a value to null the difference of said reference capacitor's charge and said sensing capacitor's charge and whereby said output is related to the ratio of the sensing and reference capacitors.

8. A sensor as recited in claim 7, wherein said demodulation means precedes said amplification means and is accomplished with a reversing switch.

9. A sensor as recited in claim 7, where said amplifier means includes a frequency-shaping network such as an integrator whereby a suitable output response speed may be chosen.

10. A sensor as recited in claim 1 adapted for ignoring stray capacitance to ground wherein said sensing capacitor connected to an additional undesired stray capacitance, wherein said sampling means operates to charge said sensing capacitor and discharge it into a storage capacitor in said accumulating means, said sensor including guarding switch means that intercept said stray capacitance with an electrostatic shield and drive said electrostatic shield with a voltage representing the voltage on said measured capacitor, whereby the effect of said stray capacitance is removed from the measurement.

11. A sensor as recited in claim 1 wherein said sampling means includes switching means for directing charges from said sensing capacitor to said accumulating means.

12. A sensor as recited in claim 1 wherein said accumulating means includes a plurality of accumulator capacitors and switching means connected to same sampling means for accumulating charge with the accumulator capacitors in parallel and for conveying the accumulated charge to said output signal generating means in series.

13. A sensor as recited in claim 12 wherein said plurality of accumulator capacitors connects to said sampling means and to ground through first and second sets of switches, respectively in response to a first control signal.

14. A sensor as recited in claim 13 including a third set of switches that connects the accumulator capacitors in series to produce the output signal.

15. A sensor as recited in claim 13 including a fourth set of switches that connects the first set of switches to said sampling means.

16. A method for measuring small variations in a value of a sensing capacitor comprising:
   A) exciting the sensing capacitor from a voltage source with an alternating voltage at a predetermined frequency whereby the voltage on the sensing capacitor reverses polarity,
   B) sampling the voltage on the sensing capacitor each time the voltage reverses polarity,
   C) accumulating the charge on the sensing capacitor during each said sampling,
   D) generating an output signal that represents the accumulated charge.

17. A method as recited in claim 16 wherein said accumulation includes charging first and second capacitors during first and second polarities of the exciting voltage, respectively.

18. A method as recited in claim 16 including high impedance buffering of the sampled signal thereby to provide a linear relationship between changes in the output signal and in the value of the sensing capacitor.

19. A method as recited in claim 16 including reverse switching during the transfer of charge from the sensing capacitor to said the accumulating means.

20. A method as recited in claim 16 wherein alternatively charging the sensing capacitor to an excitation voltage during said sampling and discharging the sensing capacitor during said accumulation and wherein output signal generation includes amplification through a high-input-impedance unity-gain amplifier.

21. A method as recited in claim 20 including the step of feeding the output voltage to said excitation voltage whereby the output voltage has a linear relationship to the measured capacitance.

22. A method as recited in 16 for making linear measurements of small values of capacitive impedance including connecting a reference capacitor in series between the sensing capacitor and the exciting means and said exciting of the sensing capacitor includes:
   i) applying a variable-amplitude alternating-current excitation signal to said sensing capacitor with its waveform in phase opposition to said predetermined frequency excitation voltage, and
   ii) amplifying with a gain substantially greater than one and demodulating the signal produced the junction of the reference and sensing capacitors thereby to generate a direct-current level output signal responsive to the difference between the charges on the reference capacitor and sensing capacitor whereby the output resulting from the amplification-demodulation assumes a value to null the difference between the charges on the reference capacitor and sensing capacitor and is related to the ratio of the capacitances of the sensing and reference capacitors.

23. A method as recited in claim 22 wherein said demodulation precedes said amplification and is accomplished by reverse switching.

24. A method as recited in claim 22 wherein said amplification includes frequency-shaping whereby a suitable output response speed may be chosen.

25. A method as recited in claim 16 wherein the sensing capacitor is connected to undesired stray capacitance and said sampling charges the sensing capacitor and discharges the sensing capacitor into a storage capacitor during said accumulation, said method including electrostatically shielding the stray capacitance and at a voltage representing the voltage on the sensing capacitor whereby the effect of said stray capacitance is removed from the measurement.

26. A method as recited in claim 16 including switching charges produced during said on the sensing for said accumulation.

27. A method as recited in claim 16 wherein said accumulating charges a plurality of accumulator capacitors wherein said accumulation of charges occurs with said accumulator capacitors in parallel and said generating obtains a signal generated during said accumulation when the plurality of accumulator capacitors are in series.

28. A method as recited in claim 27 wherein said accumulation includes grounding one electrode of each of the accumulator capacitors during said sampling.

29. A method as recited in claim 28 wherein during said accumulation one accumulator capacitor remains connected to ground and the remaining accumulator capacitors are disconnected from ground.

* * * * *